United States Patent [19]

Hafner et al.

[11] 4,304,128
[45] Dec. 8, 1981

[54] APPARATUS FOR MEASURING THE MASS OF A FLOWING MEDIUM

[75] Inventors: Udo Hafner, Lorch; Peter Romann, Stuttgart, both of Fed. Rep. of Germany

[73] Assignee: Robert Bosch GmbH, Stuttgart, Fed. Rep. of Germany

[21] Appl. No.: 83,696

[22] Filed: Oct. 11, 1979

[30] Foreign Application Priority Data

Oct. 20, 1978 [DE] Fed. Rep. of Germany ....... 2845661
Mar. 24, 1979 [DE] Fed. Rep. of Germany ....... 2911631

[51] Int. Cl.³ ........................ G01M 15/00; G01F 1/68
[52] U.S. Cl. ......................................... 73/204; 73/116
[58] Field of Search ................. 73/204, 344, 346, 349, 73/116; 428/901

[56] References Cited

U.S. PATENT DOCUMENTS

| 3,931,736 | 1/1976 | Olmstead | 73/204 |
| 3,956,928 | 5/1976 | Barrera | 73/116 |
| 3,965,730 | 6/1976 | Innes | 73/118 |
| 3,971,247 | 7/1976 | Rodder | 73/204 |

FOREIGN PATENT DOCUMENTS

| 1049458 | 1/1959 | Fed. Rep. of Germany | 428/901 |
| 2649040 | 5/1978 | Fed. Rep. of Germany | 73/204 |

OTHER PUBLICATIONS

Radio Shack Dictionary; 1974–1975, p. 272.

Primary Examiner—Gerald Goldberg
Assistant Examiner—Denis E. Corr
Attorney, Agent, or Firm—Edwin E. Greigg

[57] ABSTRACT

An apparatus is proposed for measuring the mass of a flowing medium, and in particular for measuring the air mass of internal combustion engines. The apparatus includes a resistor arranged in the stream of the flowing medium, the temperature and/or resistance parameter of this resistor being controlled in dependence on the mass of the medium, the extent to which the parameter is controlled being a measure of the mass of the flowing medium. The resistor is an element of a bridge circuit comprising at least one further resistor arranged in the stream of the flowing medium. Also included is a tubular member which has an inner surface defining the flow cross section of the flowing medium. Within this tubular member there is situated a probe ring to which both resistors are mounted to be exposed to the flowing medium. Connected to the tubular member is a terminal box within which a hybrid switching circuit is situated. The hybrid switching circuit is mounted to a mounting board and is connected, by a printed circuit board, to a multiple contact plug and to the bridge circuit.

10 Claims, 8 Drawing Figures

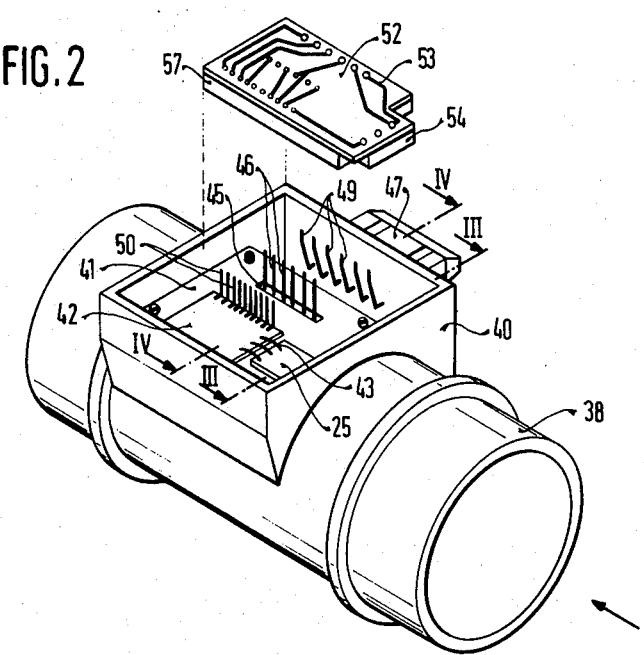
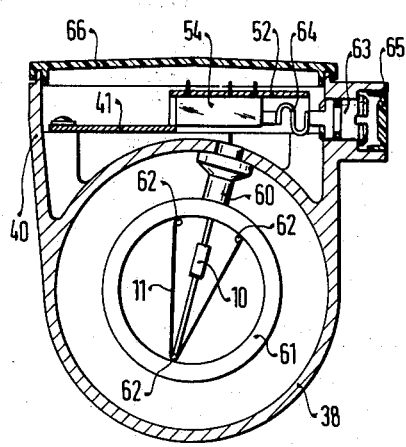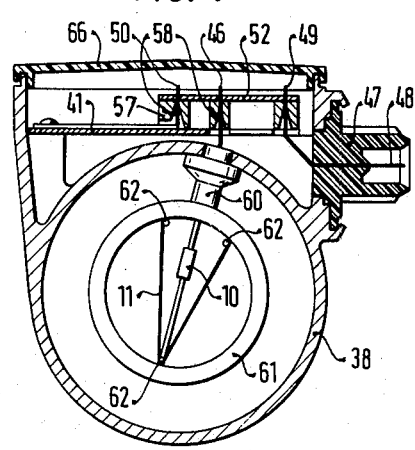

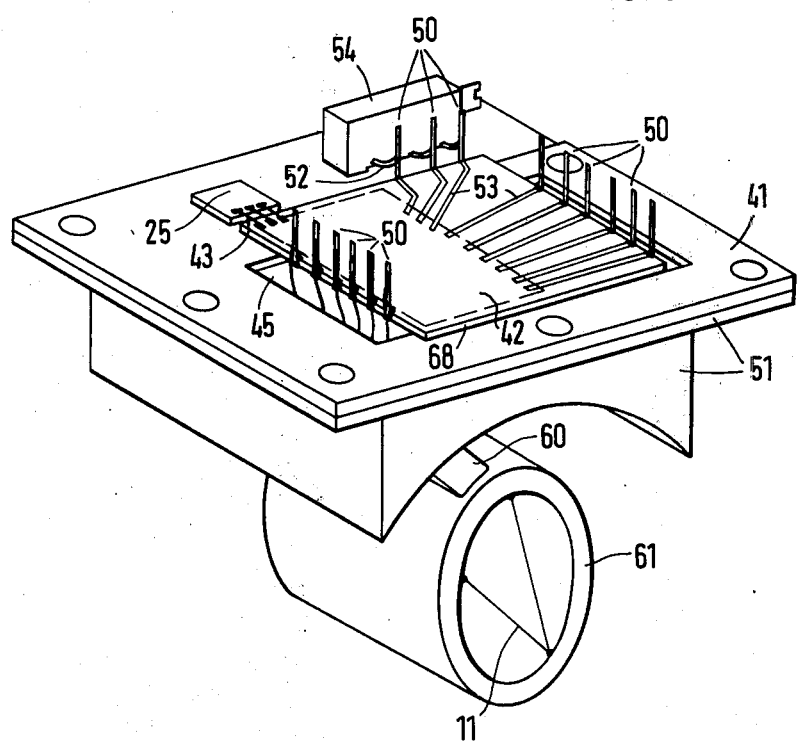

APPARATUS FOR MEASURING THE MASS OF A FLOWING MEDIUM

BACKGROUND OF THE INVENTION

The invention relates to an apparatus for measuring the mass of a flowing medium, and in particular to measuring the intake air mass of internal combustion engines which includes at least one temperature-dependent resistor arranged in the flow of the medium, the temperature and/or resistance of this temperature-dependent resistor being controlled in dependence on the mass of the flowing medium, and wherein the control variable is a measure for the mass of the flowing medium. The temperature-dependent resistor comprises a hot wire which is mounted to a probe ring mounted in a tubular member through which the medium flows. The temperature-dependent resistor forms part of a bridge circuit which comprises at least one additional temperature-dependent resistor also arranged in the flow of the medium. The bridge circuit is connected to a source of D.C. voltage by way of a multiple contact plug.

An apparatus wherein a hot wire is utilized as the temperature-dependent resistor for measuring the mass of a flowing medium is known. This hot wire is stretched taut in a probe ring at several clamping points and serves as an element of a bridge circuit. The hot wire, and the further elements of the bridge circuit, are connected to contacts of a multiple contact plug, and the multiple contact plug is mounted to a tubular member which defines the flow cross section, the probe ring being arranged within this tubular member.

Certain disadvantages are associated with this known apparatus due to the fact that the contacts become loose, induction tube resistance must be taken into account, and, when used in the intake manifold of an internal combustion engine, interferences, for example from the ignition unit, lead to measuring inaccuracies.

OBJECT, SUMMARY AND ADVANTAGES OF THE INVENTION

It is therefore an object of this invention to have an apparatus for measuring the mass of a flowing medium like that described above which avoids the noted inaccuracies.

This objective is accomplished by providing a terminal box mounted to the tubular member within which a mounting board and a printed circuit board are located. The mounting board has an electrical control device bonded thereto, which is connected by the printed circuit board to the multiple contact plug and to the bridge circuit.

The apparatus of this invention as summarized above has the advantage over the known apparatus in that loose contacts are avoided, inductance tube resistance between the bridge circuit and the electrical control device are eliminated, and, when used in an automotive vehicle, interferences, for example which derive from the ignition unit, are avoided. Furthermore, the apparatus of this invention is compact, and this compact arrangement permits an economical manufacture and assembly of the apparatus.

The direct contact, via conductors, between the electrical control device, embodied as a hybrid circuit, and the multiple contact plug, on the one hand, and the elements of the bridge circuit, on the other hand, is particularly advantageous.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 2 is a perspective view, partially exploded, of the apparatus according to the invention;

FIG. 3 is a sectional view taken along line III—III in FIG. 2;

FIG. 4 is a sectional view taken along line IV—IV in FIG. 2;

FIG. 8 is another perspective view of the apparatus according to the invention.

DESCRIPTION OF THE PREFERRED EMBODIMENTS

Figure 1:
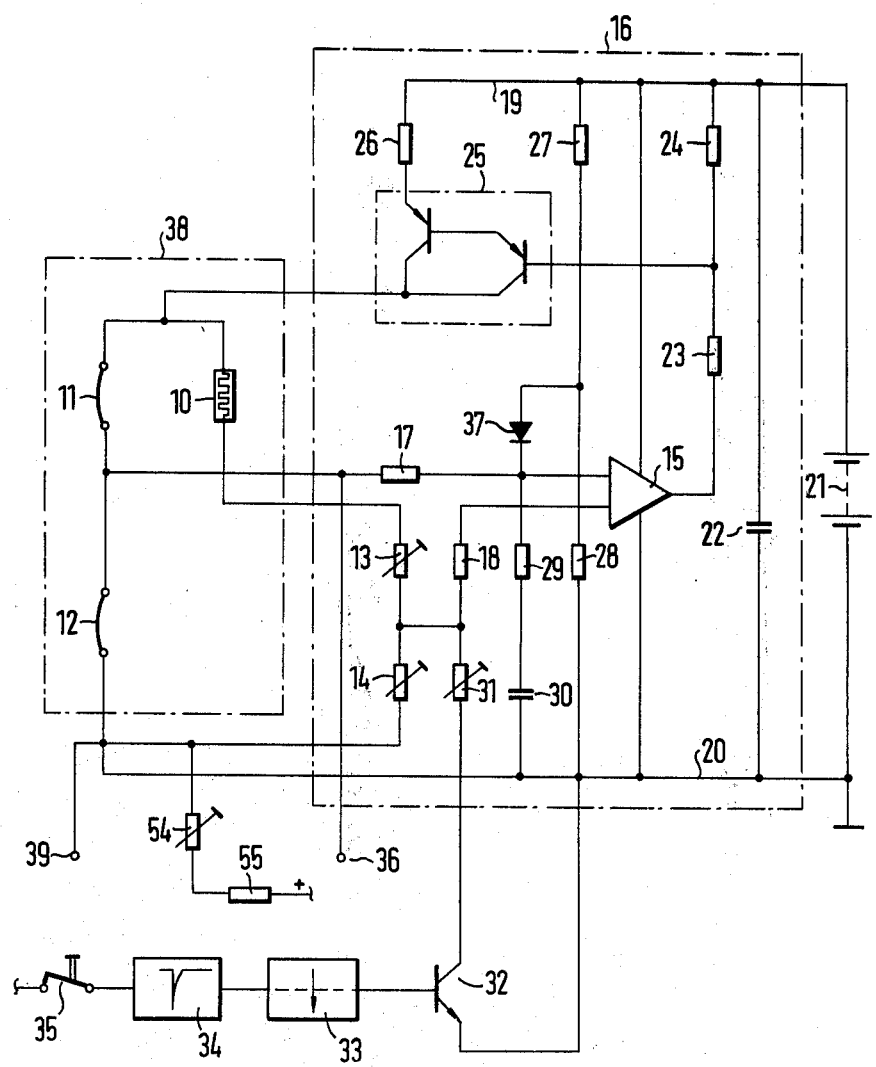
FIG. 1 is a circuit diagram of an apparatus for measuring the mass of a flowing medium, especially for measuring the intake air mass of internal combustion engines.

In the apparatus for measuring the mass of a flowing medium, especially for measuring the intake air of internal combustion engines, shown in FIG. 1, a bridge circuit is provided comprising a temperature-dependent resistor 10, a temperature-dependent resistor 11, a temperature-dependent resistor 12, and resistors 13 and 14. A control amplifier 15 of an electrical control device 16 is connected to the bridge diagonal. In this connection, the inverting input of the control amplifier 15 is connected via an input resistor 17 to the coupling point of resistors 11 and 12, while the noninverting input of the control amplifier 15 is connected via an input resistor 18 to the coupling point of the resistors 13 and 14. The control amplifier 15 is connected to a source of D.C. voltage 21 via two feed lines 19 and 20. A smoothing capacitor 22 is connected in parallel with this source of D.C. voltage 21. The output of the control amplifier 15 is connected to a series circuit of two resistors 23 and 24, the resistor 24 being connected to the common supply line 19. These two resistors 23 and 24 constitute a voltage divider for a Darlington pair 25. The Darlington pair, together with a resistor 26, forms a voltage-controlled current source for feeding current to the bridge circuit of resistors 10, 11, 12, 13, and 14. A voltage divider of resistors 27 and 28 is connected between the common supply lines 19 and 20. The anode of a diode 37 is connected to the coupling point of resistors 27 and 28, the cathode of this diode being connected to the inverting input of the control amplifier 15. A series circuit of a resistor 29 and a capacitor 30 is connected between the inverting input of the control amplifier 15 and the common supply line 20, wherein this resistor-capacitor combination serves for frequency-turning of the control circuit to the time characteristic of the thermistors.

A resistor 31 is connected to the coupling point of resistors 13 and 14; and can be connected via the switching path of a switching transistor 32 to the common supply line 20. The base of the switching transistor 32 is connected to the output of a monostable multivibrator 33, and the monostable multivibrator 33 can be triggered via a differentiating member 34 by an ignition switch 35 of the ignition unit of the internal combustion engine.

The mode of operation of the apparatus described above is as follows. A certain current flows via the temperature-dependent resistor 11 of the bridge circuit and heats this temperature-dependent resistor 11 to its normal operating temperature. In another branch of the bridge circuit, the temperature-dependent resistor 10 assumes a resistance value which characterizes the temperature of the flowing medium, for example of the air drawn into the internal combustion engine. A reference signal for the heating current control of the apparatus for air mass measurement will always be constituted by the temperature of the intake air of an internal combustion engine. The temperature-dependent resistor 11 is cooled to a greater or lesser degree as a function of the passing intake air. Cooling of the temperature-dependent resistor 11 leads to a detuning of the bridge circuit. This detuning of the bridge circuit is eliminated by the control amplifier 15, which yields, via the voltage-controlled current source 23, 24, 25, and 26, a higher supply current for the bridge circuit. Consequently, the temperature of the temperature-dependent resistor 11 and thus its resistance value is kept at an at least approximately constant value. The current flowing through the bridge circuit is a measure for the air mass flowing past the temperature-dependent resistor 11. A corresponding electric signal can be derived between a terminal 36 and a terminal 39.

To facilitate startup of the control device, the voltage divider 27, 28 with diode 37 is provided. When the control device is turned on, a voltage of about 0.5 volt is applied at the inverting input of the control amplifier 15, permitting a reliable start of the control device. In contrast thereto, during normal operation, the voltage at the inverting input of the control amplifier 15 will range considerably above this initial voltage, so that the diode 37 is nonconductive and thus no influence can be exerted on the control processes via the voltage divider 27, 28.

The temperature-dependent resistor 11 is embodied as a hot wire, and to free it from deposits on its surface, an increased current is caused to flow through the temperature-dependent resistor 11 at certain intervals after a specific measuring cycle. In this connection, a certain operating period of the internal combustion engine, for example, can be respectively selected as the measuring cycle. It proved to be especially suitable to trigger the annealing purging step, that is removal of the deposits, each time the ignition unit of the internal combustion engine is turned off. This takes place when the ignition switch 35 is cut off. The corresponding signal is differentiated and switches the monostable multivibrator 33 into its unstable switching state. During this unstable switching state of the monostable multivibrator 33, the switching transistor 32 becomes conductive and connects resistor 31 in parallel to resistor 14 of the bridge circuit. The bridge circuit of resistors 10, 11, 12, 13 and 14 is thereby strongly detuned, such that control amplifier 15 yields an increased current for the bridge circuit to compensate for this detuning. This higher current heats temperature-dependent resistor 11 for the duration of the unstable switching state of the monostable multivibrator to a temperature lying above the normal operating temperature, so that residues on the surface of the temperature-dependent resistor are burned.

It proved to be especially suitable to provide that the material of the temperature-dependent resistor 11 consists of structurally stabilized platinum wire, because this material is especially well suitable for being heated to high temperatures. This is especially important for the burn-off process.

Figure 6:
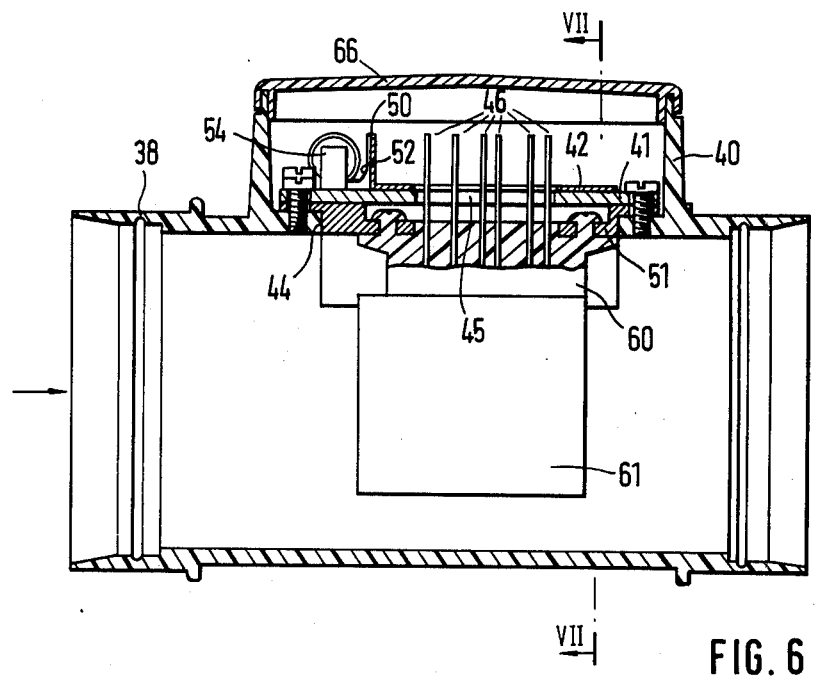
FIG. 6 is a longitudinal sectional view of the apparatus according to the invention.

Reference resistor 12 is likewise suitably accommodated in the flow cross section indicated by a broken line 38, for example the intake manifold of the internal combustion engine. In this case, the heat loss of reference resistor 12 can be dissipated by the air flowing in the direction of the arrow (FIGS. 2 and 6). Resistors 13 and 14 are suitably fashioned as adjustable resistors so that the temperature characteristic of the control circuit can be adjusted.

FIG. 2 shows a tubular member 38 which defines the flow cross section of the medium. This tubular member 38 can, for example, be a part of the intake manifold of an internal combustion engine, or it can be coupled to the intake manifold of an internal combustion engine. A terminal box 40 is provided on the periphery of the tubular member 38, a mounting board 41 being arranged in this box. The terminal box 40 serves for housing the electrical control device 16 which is suitably fashioned as a hybrid circuit 42, bonded, for example, to the mounting board 41. The power transistor 25, constructed as a Darlington pair 25, can likewise be bonded to the mounting board 41. This power transistor is connected to the hybrid circuit 42 by bonding means 43. This arrangement of the power transistor 25 on the mounting board 41 provides satisfactory heat removal of the heat produced at the power transistor. An aperture 45 is arranged in the mounting board 41 through which the contacts 46 of bridge elements 10, 11, 12 project into the interior of the terminal box 40. As will be described further below, these bridge elements are arranged in a probe ring in the flow cross section defined by the tubular member 38. A multiple contact plug 47 is mounted to the terminal box 40, the prongs 48 of this plug (FIG. 4) being connected with contact wires 49 projecting into the interior of the terminal box 40. The hybrid circuit 42 is likewise provided with a contact strip 50. A printed circuit board 52 is illustrated, which includes conductive paths 53. These conductive paths have openings through which contacts 46, 49 and 50 extend in the mounted condition of the printed circuit board 52 and are connected to the conductive paths by soldering, for example by dip-soldering or flow-soldering. The connection of hybrid circuit 42, bridge circuit elements 10, 11, 12, and multiple contact plug 47 by the printed circuit board 52 ensures short current paths so that flow wall resistances are negligibly small, and loose contacts and disturbing influences by interferences, for example by the ignition unit when the apparatus is used in an automotive vehicle, are avoided. Furthermore, all solder joints are readily accessible and thus controllable. An adjusting potentiometer 54 can likewise be connected to the printed circuit board 52 serving, when the apparatus for air mass measurement is used in the intake air of internal combustion engines, for setting a specific fuel-air ratio.

The adjusting potentiometer 54 is, as shown in FIG. 1, connected to the bridge circuit between the reference resistor 12 and the resistor 14 and is connected to the positive terminal pole by way of a resistor 55. Advantageously the printed circuit board 52 is mounted to the mounting board 41 via a frame 57. This frame, as shown in FIG. 4, has perforations 58 tapering in the direction of the printed circuit board 52, facilitating the threading of contacts 46, 49, 50 into the printed circuit board 52.

As illustrated in FIGS. 3 and 4, a probe ring 61 is supported in the tubular member 38 by means of a stem 60. The hot wire 11 is extended in this probe ring over supporting points 62. Upstream of the hot wire 11, the compensating resistor 10 is arranged in the probe ring 61 within the flow of the medium. The current leads of the bridge elements 10, 11, 12 extend in the inside of the stem 60. The adjusting potentiometer 54 can be adjusted by a set screw 63 arranged in the terminal box 40. A connecting element 64 is disposed between the set screw 63 and the adjusting potentiometer 54. The set screw 63 is covered from the outside by a safety cap 65 pressed into the wall of the terminal box 40; an unauthorized manipulation of the set screw 63 is made apparent because the safety cap can be removed only after having been destroyed. The terminal box 40 is sealed off toward the outside by a lid 66.

Figure 5:
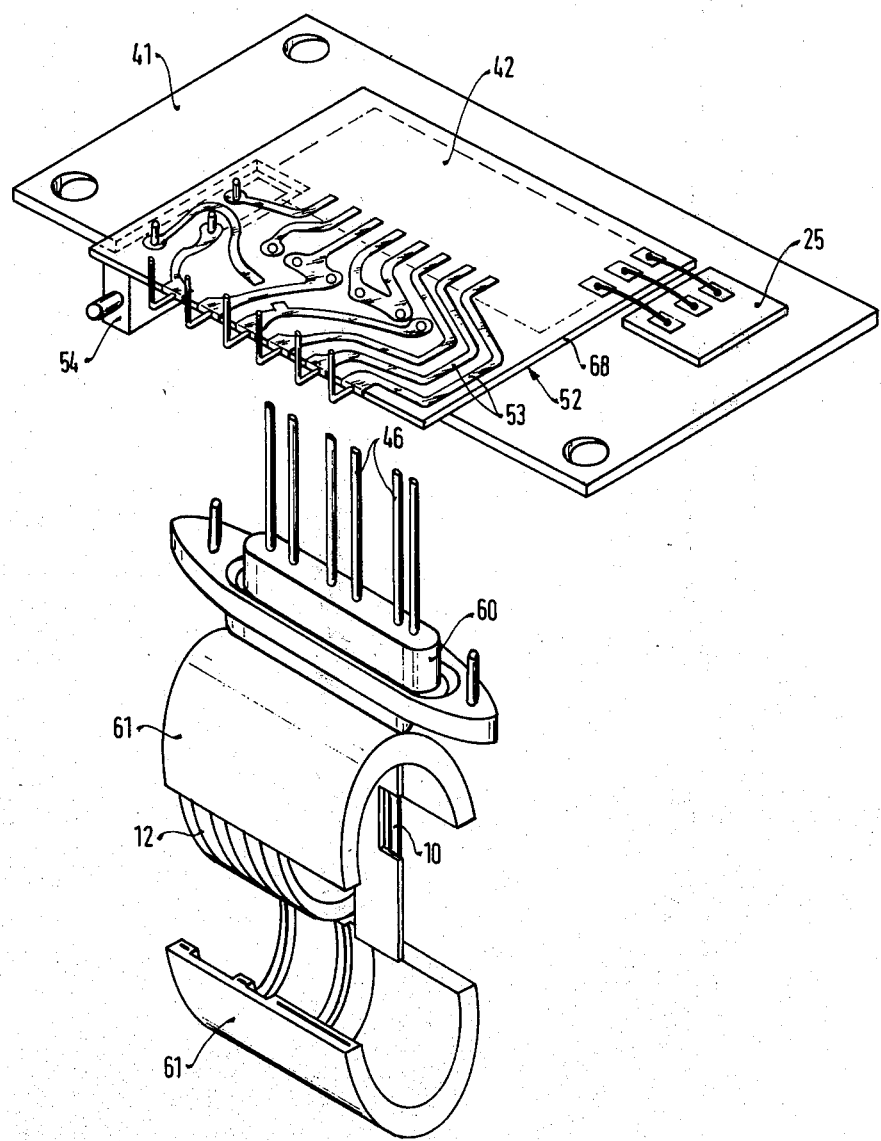
FIG. 5 is a partial exploded view illustrating the hybrid circuit and its connection to the bridge circuit.

In the embodiment shown in FIG. 5, the elements which are the same as those in the embodiment of FIGS. 2 through 4 are denoted by identical reference numerals. In the embodiment of FIG. 5, the conductive paths 53 are applied by the thick-film technique on the same carrier board 68, fashioned, for example, as a ceramic plate 68, on which the hybrid circuit 42 is likewise provided. In this connection, direct contact can take place between the conductive paths 53 and the hybrid circuit 42. Thus, in this embodiment a separate printed circuit board 52 is unnecessary. The number of contact points between the elements of the bridge circuit and the multiple contact plug is reduced, resulting in an increase in reliability.

The probe ring 61 can be constructed to be divisible in at least one plane extending in the flow direction of the medium, facilitating the mounting of elements 10, 11, 12 of the bridge circuit. As shown in FIG. 5, the reference resistor 12 can be arranged as a wire coil in the probe ring 61, downstream of the hot wire 11. The arrangement of reference resistor 12 should, if at all possible, be such that the flow of the medium takes care of a satisfactory heat removal of the heat produced at this resistor.

Figure 7:
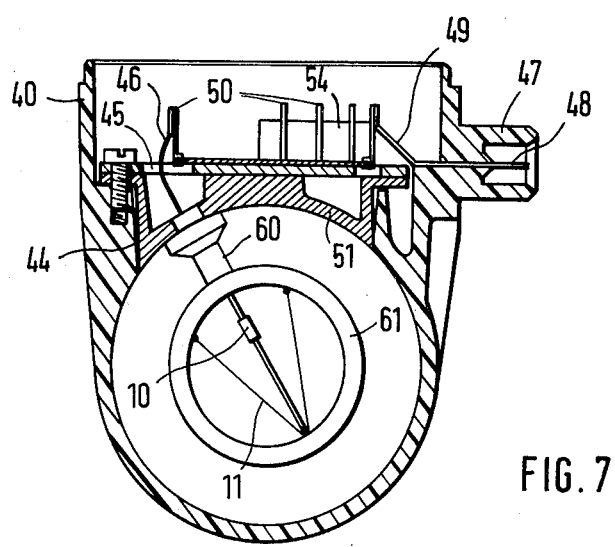
FIG. 7 is a sectional view taken along the line VII—VII in FIG. 6.

In FIGS. 6 and 7, 38 denotes a tubular member representing the flow cross section, manufactured, for example, of a synthetic resin, which tubular member can be part of the intake manifold of an internal combustion engine. Alternatively, the tubular member can be coupled into an intake manifold of an internal combustion engine. A terminal box 40 is provided on the periphery of the tubular member 38; the latter has a mounting aperture 44 in the zone of the terminal box 40, into which an insert element 51 can be placed and attached to the tubular member 38. The insert element 51 serves for accommodating the electrical control device 16 which is also suitably fashioned as a hybrid switching circuit 42. The circuit 42 is bonded, for example, to a mounting board 41 joined to the insert element 51. The power transistor 25, constructed as a Darlington pair, can likewise be bonded to the mounting board 41 (FIG. 8). This power transistor is connected with the hybrid circuit 42 by bonding means 43. The arrangement of the power transistor 25 on the mounting board provides a satisfactory heat removal of the heat produced at the power transistor, especially when the insert element 51 is made of metal. An aperture 45 is provided in the mounting board 41, through which the contacts 46 of the bridge elements 10, 11, 12 project into the interior of the terminal box 40. A multiple contact plug 47 is mounted at the terminal box 40, the prongs 48 of this plug (FIG. 7) being connected with contact wires 49 projecting into the interior of the terminal box 40.

As also shown in FIG. 8, conductive paths 53 are applied by the thick-film technique on the same carrier board 68, fashioned, for example, as a ceramic plate, on which the hybrid circuit 42 is likewise arranged; in this connection, direct contacting can be effected between conductive paths 53 and hybrid circuit 42. Thus, no separate printed circuit board is required. The number of contact points between the elements of the bridge circuit and the multiple contact plug is reduced, resulting in an increase in reliability.

Contact strips 50 are likewise provided at the carrier board 68. These contact strips are connected with the hybrid circuit 42 via conductive paths 53 with contact wires 49 of the multiple contact plug 47, with contacts 46 of the bridge elements 10, 11, 12, and with contact wires 52 of an adjustable potentiometer 54. The adjustable potentiometer 54 serves, when using the apparatus for air mass measurements of the intake air of internal combustion engines, for setting a specific fuel-air ratio and can be attached to the mounting board 41. As illustrated in FIG. 1, this adjusting potentiometer is connected to the bridge circuit between the reference resistor 12 and resistor 14 and is connected to the positive terminal via a resistor 55.

As shown in FIGS. 7 and 8, a probe ring 61 is supported on the insert element 51 by means of a stem 60 and extends into the tubular member 38. The hot wire 11 is extended within this probe ring over supporting points 62. Upstream of the hot wire 11, the compensating resistor 10 is arranged in the probe ring 61 within the flow of the medium. The current leads of the bridge elements 10, 11, 12 extend in the inside of the stem 60. The terminal box 40 is sealed off from the outside by a lid 66.

Due to the construction of the apparatus with the insert element 51, by which the mounting board 41 and the probe ring 61 are connected via the stem 60, the assembly of the probe ring 61, the elements of the bridge circuit, the electric circuit 16 of the electrical control device, and the adjusting potentiometer 54 is facilitated, and contacting at the contact strips 50 by welding or soldering is made easier since in this structure, after mounting the individual components at the insert element 51, the latter can be inserted as an individually manipulatable module in the mounting aperture 44 of the tubular member 38 and can be attached to the tubular element. Thus, even if recalibrations or repair operations may become necessary, the insert element 51 can be pulled out of the tubular member 38 in its entirety, ensuring ready accessibility.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for measuring the mass of a flowing medium, such as the intake air mass to an internal combustion engine comprising:
    a tubular member having an inner surface which defines a flow cross section of the flowing medium, a mounting aperture, an insert element which is plugged into the mounting aperture and mounted to the tubular member, a probe ring mounted to the insert element and arranged within the flow cross section, a bridge circuit including at least two resistors supported within the probe ring so that they are exposed to the flowing medium, one of said resistors being embodied as a hot wire, a parameter of which is controlled in dependence on the mass of the flowing medium, a multiple contact plug connected to the tubular member which connects the bridge circuit to a source of D.C. voltage and from which the parameter control is detected, a terminal box mounted to the tubular member, a mounting board mounted within the terminal box to the insert element, an electrical control circuit mounted to the mounting board, a printed circuit board having minimal conductive paths, (i) the extent to which the controlled parameter of said one of said resistors is controlled being a measure of the mass of the flowing medium and (ii) the electrical control circuit being connected by the printed circuit board to the multiple contact plug and to the bridge circuit, (iii) the electrical control circuit comprising a hybrid switching circuit, a frame, (iv) the frame being arranged between the mounting board and the printed circuit board, and includes perforations which taper in the direction toward the printed circuit board, and (v) the bridge circuit, the hybrid switching circuit and the multiple contact plug each including contacts, said contacts extending through the perforations in said frame.

2. The apparatus as defined in claim 1, wherein:
the electrical control circuit includes a power transistor, said electrical circuit, exclusive of said power transistor, comprising a hybrid switching circuit, both said hybrid switching circuit and said power transistor being mounted to the mounting board.

3. The apparatus as defined in claim 1, wherein:
the printed circuit board comprises a carrier board attached to the mounting board, and wherein the hybrid circuit is mounted to the carrier board.

4. The apparatus as defined in claim 3, further comprising:
an adjusting potentiometer attached to the printed circuit board, and wherein:
the adjusting potentiometer includes contacts; and
the adjusting potentiometer is connected by its contacts to the hybrid switching circuit via the conductive paths thereof.

5. The apparatus as defined in claim 1, wherein:
the probe ring is constructed as a two piece ring, with the plane of separation extending in the flow direction of the flowing medium.

6. The apparatus as defined in claim 1, wherein the controlled parameter is temperature.

7. The apparatus as defined in claim 1, wherein the controlled parameter is resistance.

8. The apparatus as defined in claim 1, wherein the controlled parameter is temperature and resistance.

9. The apparatus as defined in claim 1, wherein the insert element is made of metal.

10. The apparatus as defined in claim 1, wherein the insert element is made of a synthetic resin.

* * * * *